United States Patent [19]

Reed

[11] 4,109,604

[45] Aug. 29, 1978

[54] FRESH WATER SUPPLY AND WASTE WATER RETENTION SYSTEM

[75] Inventor: Richard E. Reed, Scottsdale, Ariz.

[73] Assignee: CAF Industries, Phoenix, Ariz.

[21] Appl. No.: 801,619

[22] Filed: May 31, 1977

[51] Int. Cl.² .......................................... B63B 35/00
[52] U.S. Cl. ................................... 114/270; 114/61;
9/1.1
[58] Field of Search ............... 114/16 E, 60, 61, 121,
114/125, 74 R, 74 A, 74 T, 270, 26; 9/1.1;
244/94, 95

[56] References Cited

U.S. PATENT DOCUMENTS 3,731,644  5/1973  Bradt ..................................... 114/61
3,745,954  7/1973  Louet ..................................... 114/26

Primary Examiner—Trygve M. Blix
Assistant Examiner—Jesus D. Sotelo
Attorney, Agent, or Firm—Cahill, Sutton & Thomas

[57] ABSTRACT

A fresh water supply and waste water retention system is incorporated within a floating carrier for transporting land based recreational vehicles on a body of water. The system includes one or more fresh water containers and one or more waste water containers, all of which are symmetrically disposed about a selected lateral axis of the carrier. The system permits the transfer of water from the fresh water containers into the waste water containers without affecting the center of gravity of either the fresh water supply and waste water retention system or the center of gravity of the floating carrier/recreational vehicle combination.

16 Claims, 7 Drawing Figures

FRESH WATER SUPPLY AND WASTE WATER RETENTION SYSTEM

BACKGROUND OF THE INVENTION

1. Field of the Invention

This invention relates to floating carriers for transporting land based recreational vehicles on a body of water, and more particularly, to a fresh water supply and waste water retention system for said carrier.

2. Description of the Prior Art

The floating vehicle carrier described in an allowed patent application entitled "Method and Apparatus for Temporarily Converting Campers and the Like to Water-Based Units", Ser. No. 587,244, which is hereby incorporated by reference, includes a first storage tank for storing a supply of fresh water and a second storage tank for receiving and storing waste water from the land based recreational vehicle which is secured to the upper surface of the carrier's deck. Each of these two storage tanks is located beneath the carrier's deck and above the surface of the water. The fresh water storage container is longitudinally aligned with the waste water storage container, but located behind the waste water storage container.

During the process of initially mating the recreational vehicle with the carrier, great care is taken to assure that the center of gravity of the carrier/vehicle combination will assure a predetermined bow high carrier planing angle to minimize the drag of the carrier's pontoons as they travel through the water. This minimization of hydrodynamic drag increases the carrier's maximum velocity and minimizes engine fuel consumption.

An adjustable hitch tree is coupled between the deck of the carrier and the tongue of the recreational vehicle to assure that the interior of the vehicle is in a precisely level position with the desired nose high carrier planing angle. This insures that natural gas powered refrigerators frequently incorporated within recreational vehicles are aligned within the requisite one to two degrees with the horizontal plane. This positioning is critical since these refrigerators cease operation when improperly levelled.

After the initial positioning of the vehicle upon the carrier, an employee of the carrier takes the carrier on a test hop to ensure that the desired bow up planing angle has been obtained.

After sufficient fresh water is drawn from the carrier's fresh water container and transferred into its waste water container, there will be a noticeable shift in the center of gravity of the carrier/vehicle combination if the relative distance between the fresh water and waste water tanks is great along the longitudinal axis of the carrier. A forward center of gravity shift can easily produce a substantial lowering of the bow below the desired bow high planing angle, causing plowing of the bow through the water, increased hydrodynamic drag, a decreased maximum obtainable carrier velocity, and a substantial increase in fuel consumption per mile traveled through the water. Furthermore, substantial difficulties are often encountered with the operation of gas powered refrigerators due to the resulting deviation of the vehicle from its previously level orientation. A rear center of gravity shift can affect the operation of gas powered refrigerators contained in the vehicle or camper.

This highly undesirable shift in the center of gravity often occurs prior to the time when the user desires to return the carrier, but the various problems arising from the center of gravity shift often require the user to return the carrier to the operator for readjustment. The return trip necessitated by the center of gravity shift irritates users since they are inconvenienced and a portion of their highly valued vacation time is wasted. The carrier operator's overhead is also increased by the time which his employees must spend to readjust the center of gravity of the carrier/vehicle combination.

Various prior art carrier systems have been devised to transport land based recreational vehicles on a body of water. The following U.S. Pat. Nos. disclose various carrier embodiments: 3,731,644 (Bradt); 3,745,954 (Louet); 3,807,338 (Shader); 3,265,025 (Haigh); 3,673,622 (Allen); 3,657,751 (Shaw); and 3,335,437 (Judkins).

A careful study of each of the above-mentioned patents reveals that only the Bradt patent even addresses the problem of providing a supplementary source of fresh water for the recreational vehicle. As a waste water storage container for water craft on lakes and rivers is now generally required by law to prevent contamination of the body of water by waste water, some system must be provided for the carrier under discussion to accomplish this purpose.

The disadvantage created by positioning a single fresh water supply tank and a single waste water storage tank along the centerline of a floating carrier have previously been discussed. Of the prior art cited above, only the Bradt patent discloses a means for storing waste water discharged from the recreational vehicle. As can be noted, however, the Bradt waste water storage container is disposed in a single pontoon such that over a period of time discharge of water from the recreational vehicle into the waste water storage container will result in a substantial lateral shift of the carrier's center of gravity. This lateral shift in the carrier's center of gravity will cause increased drag from that pontoon which will lead to directional instability, handling difficulties and occupant discomfort since the carrier will list to one side. Unless Bradt's storage container is precisely aligned with the longitudinal position of the carrier/vehicle combination, filling the storage container with waste water will also shift the center of gravity either fore or aft, which could produce additional undesirable results.

Bradt provides a supply of fresh water by including cans containing fresh water which can be situated on and moved about the deck or stored in recesses within a pontoon. In order to maintain a balanced center of gravity, the operator of the Bradt carrier must periodically reposition the cans of fresh water. After the water in the fresh water containers has been exhausted, all of the resulting waste water will have been transferred to the waste water holding tank located within one of the pontoons. His system, therefore, tends to maximize the carrier imbalance with the passage of time.

Louet provides a plurality of water ballast tanks at the four corners of his barge in order to shift the center of gravity of the barge to facilitate loading of the recreational vehicle on the barge at a dock. His system is in no way related to the storage of a supply of fresh water or to receiving and storing waste water.

None of the other cited patents provide a fresh water supply or a storage container for waste water.

SUMMARY OF THE INVENTION

It is therefore a primary object of the present invention to provide a floating carrier having a fresh water supply and a waste water retention system which will not alter the center of gravity of the carrier as fresh water is consumed and waste water is stored.

Another object of the present invention is to provide a floating carrier which eliminates the requirement to return to the launching facility after a lapse of time to readjust the center of gravity of the carrier/recreational vehicle combination.

Still another object of the present invention is to provide a floating carrier which prevents an increase in hydrodynamic drag as a result of the forward or rearward center of gravity shift of the carrier/recreational vehicle combination.

Still another object of the present invention is to provide a floating carrier which permits a substantial increase in the capacity of the fresh water supply and waste water holding system by eliminating difficulties encountered due to center of gravity shifts resulting from the transfer of water from the fresh water container into the waste water container.

Yet another object of the present invention is to provide a floating carrier which minimizes hydrodynamic drag and thereby conserves fuel.

Briefly stated, and in accord with one embodiment of the invention, a floating carrier for transporting land based recreational vehicles on a body of water includes float means for bouyantly supporting the carrier above the water and a deck disposed above and coupled to the float means for supporting the vehicle. The vehicle includes an inlet for receiving fresh water into the vehicle, an outlet for draining waste water from the vehicle, and means for controlling the flow of fresh water within the vehicle. A fresh water supply and a waste water retention system forms a part of the carrier and serves the purpose of maintaining the center of gravity of the system and the carrier/recreational vehicle combination substantially constant. The fresh water supply and waste water retention system includes fresh water container means for storing fresh water and for supplying fresh water to the inlet of the vehicle. The fresh water container means is symmetrically disposed about a selected lateral axis of the carrier.

The system also includes waste water container means which is coupled to the outlet of the vehicle for storing waste water drained from the vehicle. The waste water container means is symmetrically disposed about the selected lateral axis of the carrier.

Incorporation of this fresh water supply and waste water retention system permits the removal of fresh water from the fresh water containers and the draining of waste water into the waste water containers without causing any substantial effect on the center of gravity of either the system itself or on the floating carrier/recreational vehicle combination.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

DESCRIPTION OF THE PREFERRED EMBODIMENT

In order to better illustrate the advantages of the invention and its contributions to the art, a preferred hardware embodiment of the invention will now be described in some detail.

Figure 1:
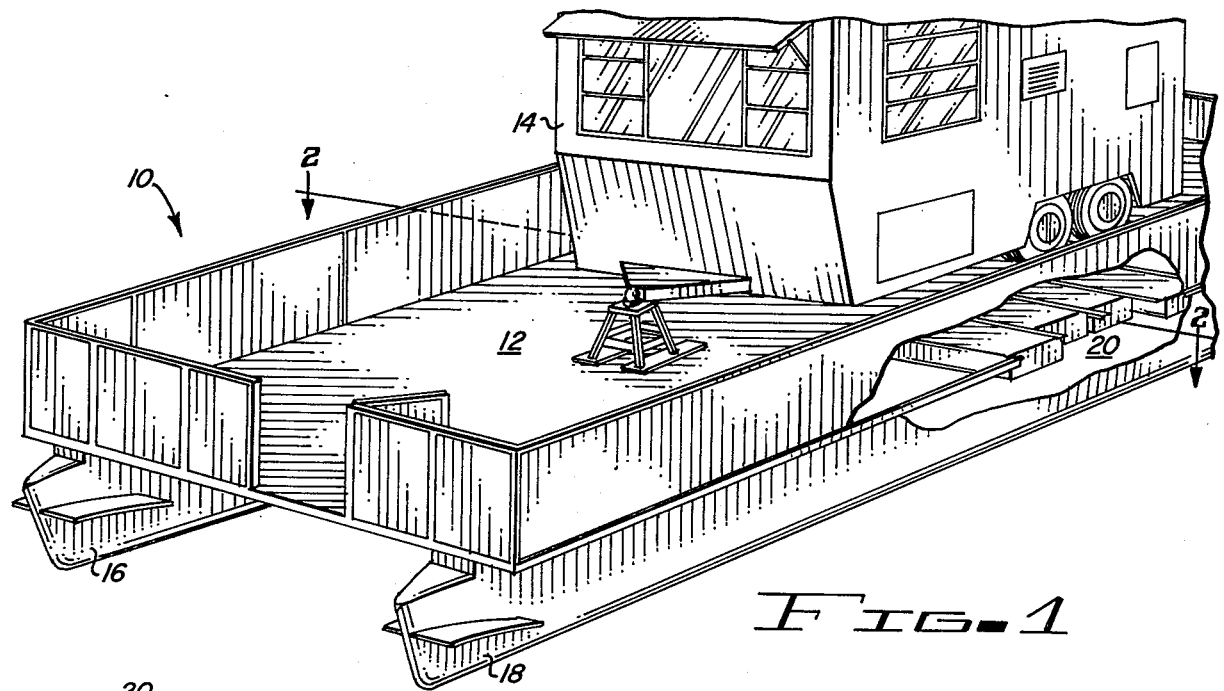
FIG. 1 is a perspective view of a floating carrier and a land based recreational vehicle, partially cut away to show the elements of a fresh water supply and waste water retention system of the present invention.
Figure 2:
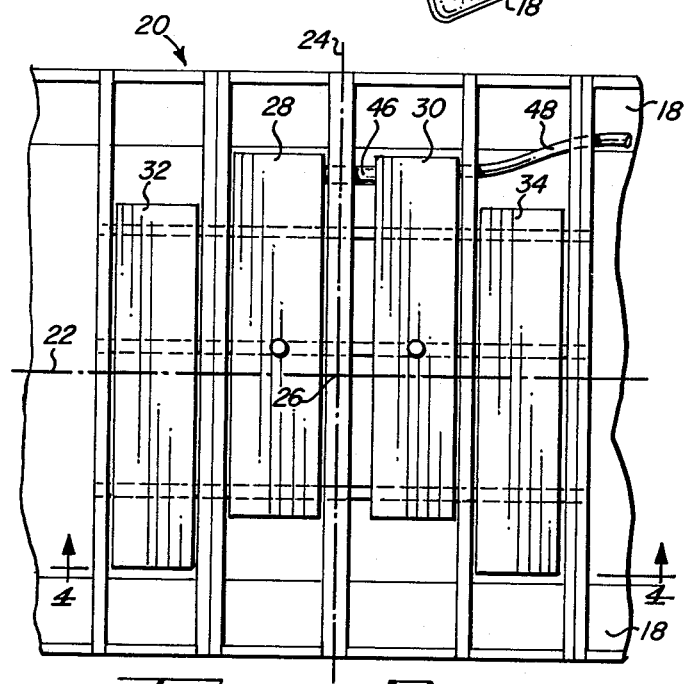
FIG. 2 is a sectional view of the fresh water supply and waste water retention system shown in the partially cut away portion of FIG. 1, taken along section line 2—2.

Referring to FIGS. 1 and 2, floating carrier 10 includes a deck 12 to which a recreational vehicle 14 is secured. Recreational vehicle 14 can be a wheeled vehicle or a wheelless vehicle such as a camper shell. A pair of pontoons 16 and 18 are positioned beneath the deck and bouyantly support the carrier and recreational vehicle combination. Between the two pontoons and beneath the deck, the fresh water supply and waste water retention system 20 of the present invention is positioned.

In FIG. 2 reference number 22 indicates the longitudinal axis of carrier 10 while reference number 26 indicates the location of the midposition of system 20 along longitudinal axis 22. A lateral axis indicated by reference numeral 24 has been drawn through midpoint 26 and forms a reference plane about which system 20 must be symmetrically disposed.

Figure 3:
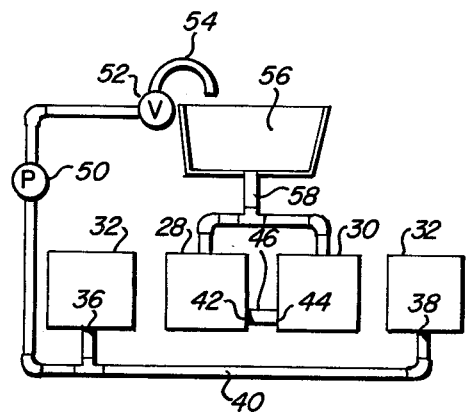
FIG. 3 is a schematic representation of the operational elements of the present invention.
Figure 4:
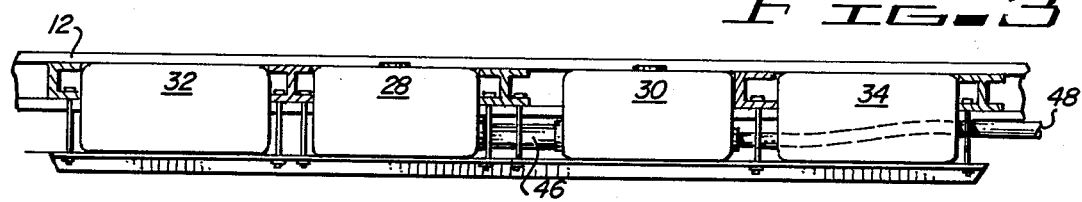
FIG. 4 is a view of the system illustrated in FIG. 2, taken along section line 4—4.

Referring now to FIGS. 2, 3, and 4, system 20 includes waste water containers 28 and 30 and fresh water containers 32 and 34. It is a primary requirement of the present system that waste water containers 28 and 30 be symmetrically disposed about lateral axis 24 and that fresh water containers 32 and 34 also be symmetrically disposed with respect to lateral axis 24. If desired, the relative positioning of the fresh water containers with respect to the waste water containers can be reversed without affecting the performance of the system.

The weight and therefore the volume of fluid must be equalized between each symmetrically disposed pair of containers. Apertures 36 and 38 are provided in the lower portion of fresh water containers 32 and 34 and a pipe 40 couples these two apertures together to provide for the free flow of fresh water between containers 32 and 34 so that the water within each of these containers may seek its own level and thereby equalize the weight of fluid within each container.

A pair of apertures 42 and 44 is provided in the lower portion of waste water containers 28 and 30, these apertures are coupled together by passageway 46 to allow equalization of the level of waste water between containers 28 and 30 in a manner similar to that described above for fresh water containers 32 and 34.

A drain line 48 is coupled to the lowermost portion of one of the waste water containers, such as container 30, to facilitate removal of the waste water from each of the waste water tanks when readying the carrier for subsequent use.

A pump 50 situated either in the carrier or in the recreational vehicle is coupled to pipe 40 and supplies water under pressure to valve 52. The occupants of the carrier will either consume the water drained from pipe 54 or will cause the fresh water to be converted to waste water by utilizing it for washing or bathing, or for cooking or cleaning. Water thus used will be drained into collector 56 and routed through drain line 58 into waste water containers 28 and 30.

The volume of the waste water containers can be either smaller or larger then the volume of the fresh water containers to accommodate varying requirements. In the preferred embodiment the capacity of the waste water containers is slightly greater than the capacity of the fresh water containers. The capacity of the system can be increased as desired by either increasing the size of the individual fresh water and waste water containers or by multiplying the number of paired containers.

As can be seen from FIG. 2, the pair of waste water containers and the pair of fresh water containers are not symmetrically disposed with respect to longitudinal axis 22. This intentional offset is provided to allow simplified routing of the various plumbing elements to the various tanks. This type of staggered alignment may create a slight lateral imbalance, but this imbalance is insignificant in comparison to the weight of the carrier/recreational vehicle combination.

FIG. 4 also illustrates the mechanical features provided to couple the various elements of system 20 to deck 12.

Figure 5:
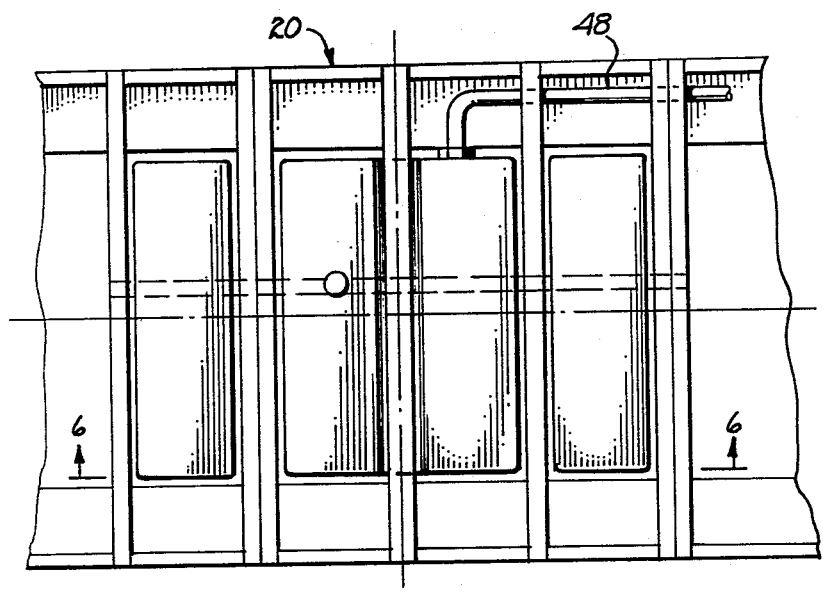
FIG. 5 is a sectional view of an alternative embodiment of the fresh water supply and waste water retention system shown in FIG. 2.
Figure 6:
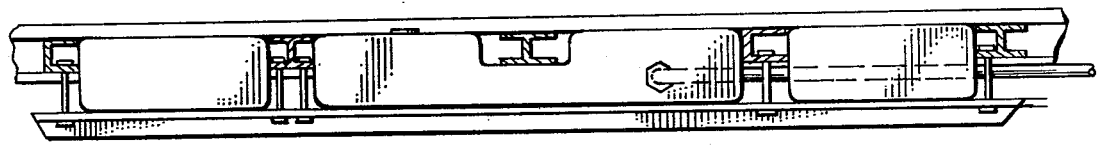
FIG. 6 is a sectional view of FIG. 5 taken along lines 6—6.
Figure 7:
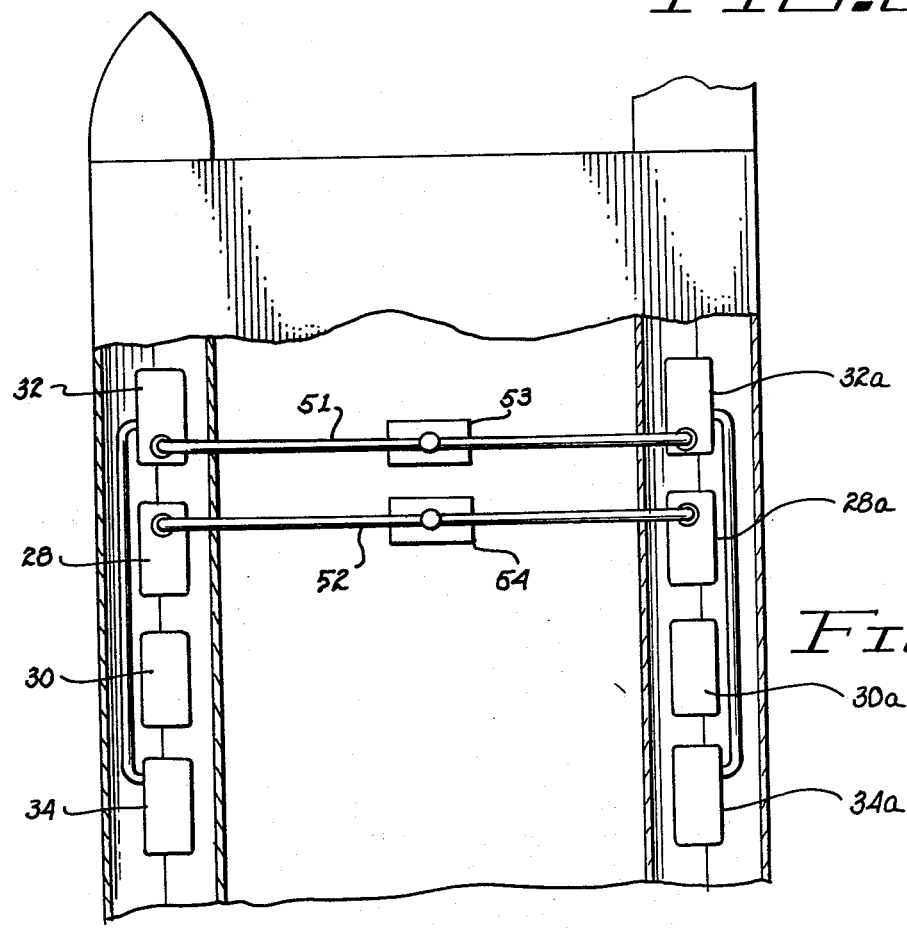
FIG. 7 is a top schematic view of still another embodiment of the present invention.

It will be apparent to those skilled in the art that the disclosed fresh water supply and waste water retention system may be modified in numerous other ways and may assume many other embodiments other than the preferred forms specifically set out and described above. The size and staggered or parallel alignment of the fresh and waste water containers can be altered without affecting the overall operation of the system. Instead of positioning these containers beneath the deck between the pontoons, it is equally possible to incorporate these containers within each of the pontoons. In that embodiment a pair of waste water containers and a pair of fresh water containers would have to be incorporated within each of the two pontoons to assure proper operation of the center of gravity maintenance system, as shown schematically in FIG. 7. In FIG. 7, the waste water containers 28 and 30 have been duplicated as waste water containers 28a and 30a. Similarly, fresh water containers 32 and 34 have been duplicated as containers 32a and 34a; the connections to the containers may be achieved in any convenient manner such as by pipes 51 and 52 having appropriate T's 53 and 54, respectively, for connection to a pump or drain such as that shown in FIG. 3. Furthermore, it may be desirable to design a system having a single tank placed at the center of gravity of the carrier and an additional pair of tanks symmetrically disposed about the carriers center of gravity, such as shown in FIGS. 5 and 6. The fresh water could be stored either in the single tank or in the paired tanks. Any other odd or even number of storage tanks can be used as long as the symmetrical distribution with respect to the center of gravity is maintained.

What is claimed is:

1. In a floating carrier for transporting land based recreational vehicles on a body of water, said carrier including
   (a) float means for bouyantly supporting said carrier above the water, said carrier having a center of gravity; and
   (b) a deck disposed above and coupled to said float means for supporting said vehicle;
said vehicle including
   (a) an inlet for receiving fresh water into said vehicle;
   (b) an outlet for draining waste water from said vehicle; and
   (c) means for controlling the flow of fresh water within said vehicle;
a fresh water supply and waste water retention system having a midpoint and forming a part of said carrier for maintaining the center of gravity of said system substantially constant as fresh water is supplied to said vehicle and waste water is received from said vehicle, said system comprising in combination:
   (a) fresh water container means for storing fresh water and for supplying fresh water to said inlet of said vehicle, symmetrically disposed about a selected lateral axis of said carrier, the midpoint of said system passing through the selected lateral axis of said carrier; and
   (b) waste water container means coupled to said outlet for storing waste water drained from said vehicle, symmetrically disposed about the selected lateral axis of said carrier;
whereby drawing fresh water from said fresh water container means and draining waste water into said waste water container means will have substantially no effect on the center of gravity of said system or the center of gravity of said carrier/vehicle combination.

2. The system according to claim 1 wherein said fresh water container means includes a pair of fresh water containers symmetrically disposed about a selected lateral axis of said carrier.

3. The system according to claim 2 wherein said waste water container means includes a pair of waste water containers symmetrically disposed about the selected axis of said carrier.

4. The system according to claim 3 further including:
   (a) first means for equalizing the volume of fresh water between said paired fresh water containers; and
   (b) second means for equalizing the volume of waste water between said paired waste water containers.

5. The system according to claim 4 wherein each of said fresh water containers includes a lower surface and wherein said first equalizing means includes an aperture disposed in the lower portion of each fresh water container and means coupled to the apertures in said fresh water containers for permitting fresh water to flow between said fresh water containers.

6. The system according to claim 4 wherein each of said waste water containers includes a lower portion and wherein said second equalizing means includes means coupled to the lower portion of each of said waste water containers for permitting free flow of waste water between said waste water containers.

7. The system according to claim 4 wherein said float means includes a pair of spaced, longitudinally aligned pontoons.

8. The system according to claim 7 wherein said fresh water containers and said waste water containers are disposed below said deck and between said pontoons.

9. The apparatus according to claim 7 wherein said fresh water containers and said waste water containers are positioned within each of said pontoons.

10. The system according to claim 4 wherein said system includes two fresh water containers and two waste water containers.

11. The system according to claim 4 wherein said system includes four fresh water containers and four waste water containers.

12. The system according to claim 11 wherein said two waste water containers are laterally staggered with respect to said two fresh water containers for permitting attachment of a waste water drain line to one of said waste water containers.

13. The system according to claim 2 wherein said fresh water container means includes two fresh water containers and wherein said waste water container means includes one waste water container.

14. The system according to claim 2 wherein said fresh water container means includes one fresh water container and said waste water container means includes two waste water containers.

15. The system according to claim 1 wherein said waste water container means includes a plurality of paired waste water containers symmetrically disposed about the selected lateral axis of said carrier.

16. The system according to claim 15 wherein said fresh water container means includes one fresh water container and wherein said waste water container means includes two waste water containers.

* * * * *